US012637010B2

(12) United States Patent
He et al.

(10) Patent No.: US 12,637,010 B2
(45) Date of Patent: May 26, 2026

(54) CAMERA MONITOR SYSTEM TRAILER BACKUP TRAJECTORY OVERLAY WITH VEHICLE SPEED-BASED CORRECTION

(71) Applicant: Stoneridge Electronics AB, Solna (SE)

(72) Inventors: Yu He, Dearborn Heights, MI (US); Utkarsh Sharma, Farmington Hills, MI (US); Liang Ma, Rochester, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 0 days.

(21) Appl. No.: 18/775,271

(22) Filed: Jul. 17, 2024

(65) Prior Publication Data

US 2026/0021766 A1     Jan. 22, 2026

(51) Int. Cl.
*B60R 1/26*          (2022.01)
*B60R 1/00*          (2022.01)
*B62D 13/06*         (2006.01)

(52) U.S. Cl.
CPC ................ *B60R 1/26* (2022.01); *B60R 1/002* (2013.01); *B62D 13/06* (2013.01); *B60R 2300/607* (2013.01); *B60R 2300/8046* (2013.01); *B60R 2300/8086* (2013.01); *B60R 2300/8093* (2013.01)

(58) Field of Classification Search
CPC ..... B60R 1/26; B60R 1/002; B60R 2300/607; B60R 2300/8046; B60R 2300/8086; B60R 2300/8093; B62D 13/06
See application file for complete search history.

(56) References Cited

U.S. PATENT DOCUMENTS

| | | | |
|---|---|---|---|
| 9,156,496 B2 | 10/2015 | Greenwood et al. | |
| 9,566,911 B2 | 2/2017 | Greenwood et al. | |
| 2018/0319437 A1 | 11/2018 | Hu et al. | |
| 2018/0362026 A1 | 12/2018 | Heimberger et al. | |
| 2019/0322317 A1 | 10/2019 | Pourrezaei Khaligh et al. | |
| 2020/0143174 A1 | 5/2020 | Luo et al. | |
| 2021/0403087 A1 * | 12/2021 | Mayer ................. B62D 15/025 |

FOREIGN PATENT DOCUMENTS

| | | |
|---|---|---|
| EP | 4070996 A1 | 10/2022 |
| JP | 2023172329 A | 12/2023 |
| WO | 2024107690 A1 | 5/2024 |

OTHER PUBLICATIONS

International Search Report and Written Opinion for International Application No. PCT/US2023/079589 mailed Mar. 5, 2024.
Extended European Search Report for European Application No. 25187965.6 mailed Dec. 5, 2025.

* cited by examiner

*Primary Examiner* — James M Pontius
(74) *Attorney, Agent, or Firm* — Carlson, Gaskey & Olds, P.C.

(57) ABSTRACT

A method of determining a trailer trajectory for a trailer includes the steps while the trailer is moving: determining a trailer location based upon at least one captured image, determining a trailer angle change rate based upon the at least one captured image, determining a trailer trajectory based upon the trailer location and the trailer angle change rate, and displaying an overlay related to the trailer trajectory. While the trailer is below a threshold speed the method includes the steps of: determining a steering change, revising the trailer trajectory based upon the steering change, and displaying a modified overlay related to the trailer trajectory based upon the steering change.

20 Claims, 4 Drawing Sheets

300

310

Determine trailer location and angle

305

320

Estimate trailer angle change rate

330

Compute trailer location

335

Determine trailer trajectory in 3D space

340

348

Revise trailer trajectory

Yes

347

Tractor steering change at zero vehicle velocity ?

345

No

350

Convert 3D trajectory to 2D overlay

360

Apply 2D overlay to rear view display

FIG. 4

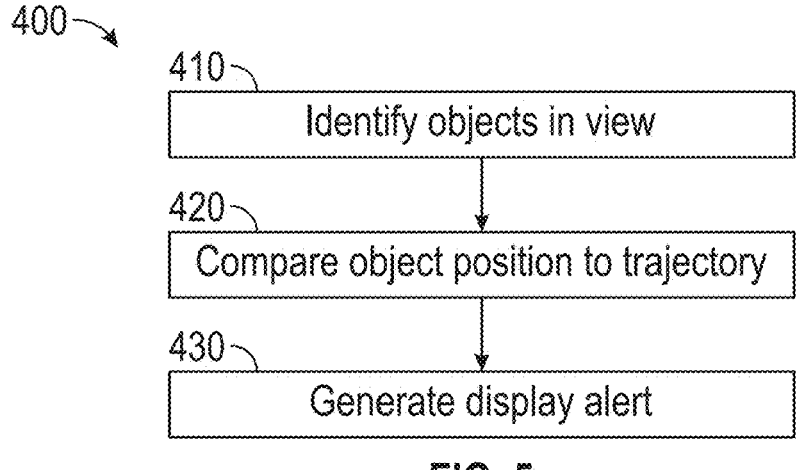

400

410

Identify objects in view

420

Compare object position to trajectory

430

Generate display alert

FIG. 5

CAMERA MONITOR SYSTEM TRAILER BACKUP TRAJECTORY OVERLAY WITH VEHICLE SPEED-BASED CORRECTION

TECHNICAL FIELD

This disclosure relates to a camera monitor system (CMS) for use in a vehicle pulling a trailer, and in particular, to a system for displaying a trajectory of an expected trailer path during a reversing maneuver.

BACKGROUND

Mirror replacement systems, and camera systems for supplementing mirror views, are utilized in commercial vehicles to enhance the ability of a vehicle operator to see a surrounding environment. Camera monitor systems (CMS) utilize one or more cameras disposed about the vehicle to provide an enhanced field of view to a vehicle operator. In some examples, mirror replacement systems within the CMS can cover a larger field of view than a conventional mirror, or can include views that are not fully obtainable via a conventional mirror.

The area behind a trailer is a typical blind spot in a conventional mirror system resulting in difficult reversing maneuvers while a trailer is attached. Further impacting the difficulty for vehicle operation is the fact that the trailer motion during a reversing maneuver is different from trailer motion during a forward maneuver and driver assistance systems and estimation techniques that are usable for forward maneuvers are not typically usable during reversing maneuvers.

One method for determining trailer trajectory during reversing maneuvers has several drawbacks, for example, no considering the effects of steering angle of the tractor. The predicted path cannot be updated when driver changes the steering wheel at zero vehicle speed. The previous prediction model loses accuracy when trailer angular velocity is large, and the performance degrades for maneuvers where trailer turns quickly. The previous prediction model assumes the trailer angular velocity maintains same during the prediction horizon, which is not true because trailer angular velocity can change depending on vehicle dynamics. This assumption can lead to large long-term prediction error.

But, using steering angle of the towing vehicle can also be inaccurate. So, another method of determining trailer trajectory during reversing maneuvers is also lacking. For example, the method does not account for towing vehicle's motion as well as trailer velocities, and only uses a simplistic virtual steering angle for the trailer (to generate an arc of radius) to calculate its predicted path. Hence, this method would be highly inaccurate.

SUMMARY

In one exemplary embodiment, a method of determining a trailer trajectory for a trailer includes the steps of a) while the trailer is moving, a1) determining a trailer location based upon at least one captured image, a2) determining a trailer angle change rate based upon the at least one captured image, a3) determining a trailer trajectory based upon the trailer location and the trailer angle change rate, a4) displaying an overlay related to the trailer trajectory, b) while the trailer is below a threshold speed, b1) determining a steering change, b2) revising the trailer trajectory based upon the steering change, and b3) displaying a modified overlay related to the trailer trajectory based upon the steering change.

In a further embodiment of any of the above, steps a) and b) are performed while the trailer is moving in reverse.

In a further embodiment of any of the above, step a1) is performed by identifying at least one of a trailer wheel and a trailer end.

In a further embodiment of any of the above, step a2) is performed by determining a trailer angle, a change in the trailer angle over an interval, and a change in the trailer location over the interval.

In a further embodiment of any of the above, the interval is at least one of time and distance.

In a further embodiment of any of the above, step a3) is performed using the trailer location over the interval.

In a further embodiment of any of the above, steps a4) and b3) are performed by displaying an overlay of the trailer trajectory onto a displayed captured image.

In a further embodiment of any of the above, the displayed captured image is different than the at least one captured image.

In a further embodiment of any of the above, the displayed captured image is part of a bird's-eye-view or a trailer rear view.

In a further embodiment of any of the above, the displayed captured image is the same as the at least one captured image.

In a further embodiment of any of the above, the threshold speed is 2 miles per hour.

In a further embodiment of any of the above, the threshold speed is zero miles per hour.

In a further embodiment of any of the above, the trailer angle change rate is zero.

In a further embodiment of any of the above, step b1) is performed by obtaining the steering angle from a CAN bus.

In another exemplary embodiment, a camera monitor system (CMS) for a vehicle includes at least one rear-facing camera that is configured to obtain at least one captured image, at least one display that is configured to depict the at least one captured image, a CMS controller that includes a memory and a processor, the CMS controller is in communication with the at least one rear-facing camera and the at least one display, the memory storing instructions for causing the processor to a) while the trailer is moving, a1) determine a trailer location based upon the at least one captured image, a2) determine a trailer angle change rate based upon the at least one captured image, a3) determine a trailer trajectory based upon the trailer location and the trailer angle change rate, a4) display an overlay related to the trailer trajectory on one of the at least one displays, b) while the trailer is below a threshold speed, b1) determine a steering change, b2) revise the trailer trajectory based upon the steering change, and b3) display a modified overlay related to the trailer trajectory based upon the steering change.

In a further embodiment of any of the above, steps a) and b) are performed while the trailer is moving in reverse, and step b1) is performed by obtaining the steering angle from a CAN bus.

In a further embodiment of any of the above, step a1) is performed by identifying at least one of a trailer wheel and a trailer end, step a2) is performed by determining a trailer angle, a change in the trailer angle over an interval, and a change in the trailer location over the interval, and step a3) is performed using the trailer location over the interval.

In a further embodiment of any of the above, steps a4) and b3) are performed by displaying an overlay of the trailer trajectory onto a displayed captured image.

In a further embodiment of any of the above, the threshold speed is 2 miles per hour.

In a further embodiment of any of the above, the threshold speed is zero miles per hour. The trailer angle change rate is zero.

BRIEF DESCRIPTION OF THE DRAWINGS

The disclosure can be further understood by reference to the following detailed description when considered in connection with the accompanying drawings wherein:

FIG. 4 illustrates a method for creating a rearview trajectory overlay for the displayed rear view in FIG. 3.

FIG. 5 illustrates a method for generating an alert based on the projected trajectory.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
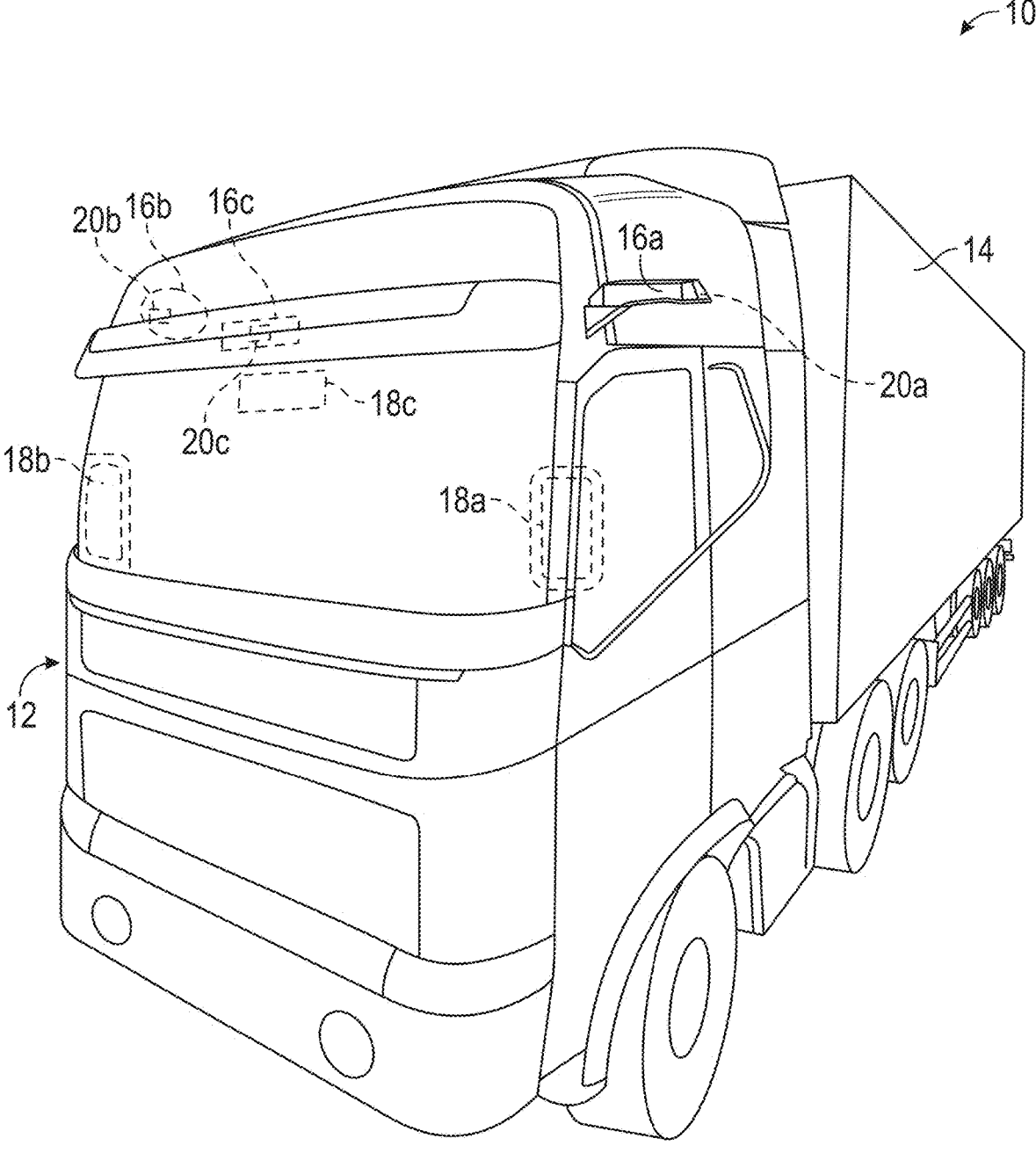
FIG. 1A is a schematic front view of a commercial truck with a camera monitor system (CMS) used to provide at least Class II and Class IV views.
Figure 1B:
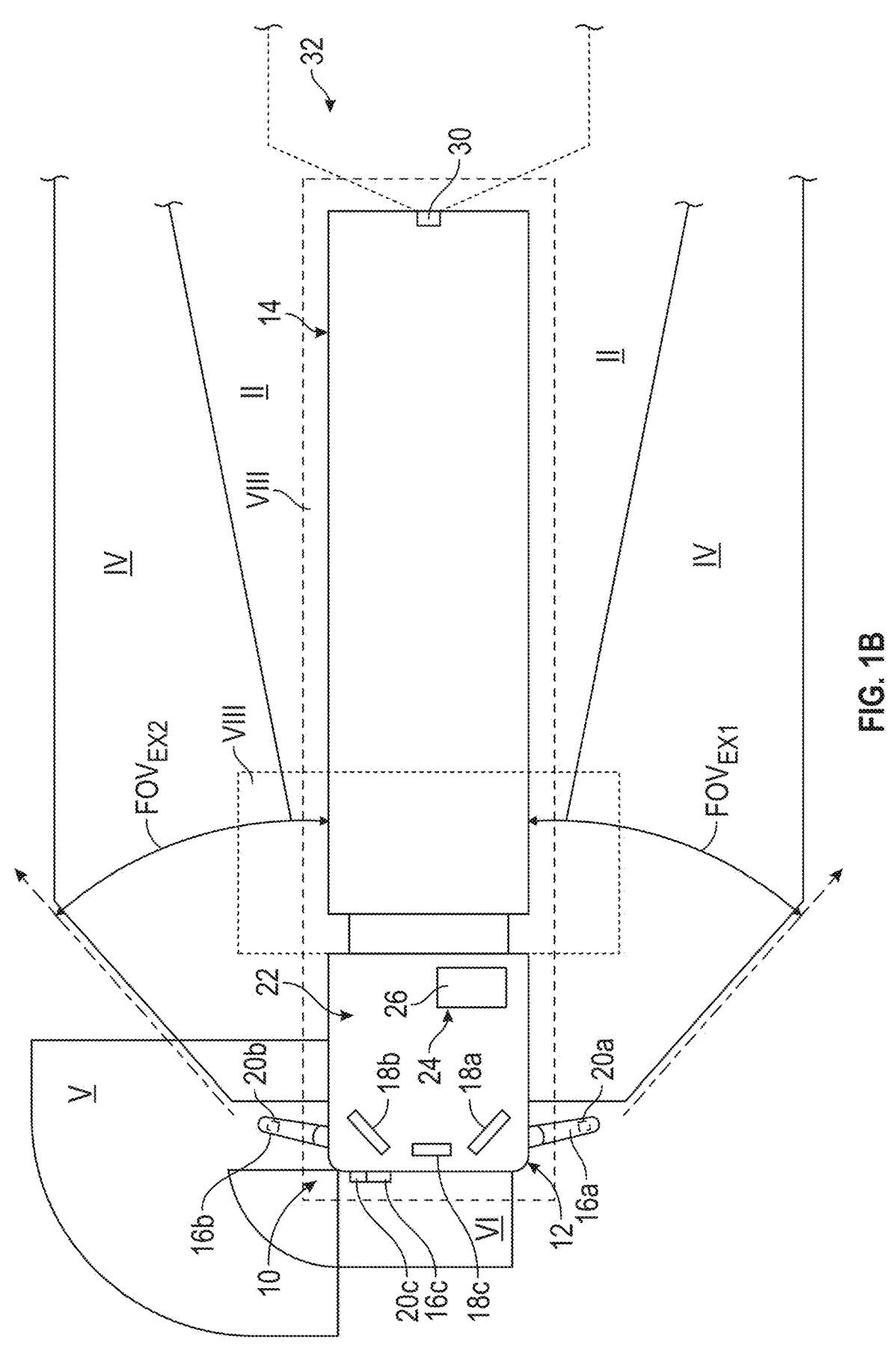
FIG. 1B is a schematic top elevational view of a commercial truck with a camera mirror system providing Class II, Class IV, Class V, Class VI and Class VIII views.
Figure 2:
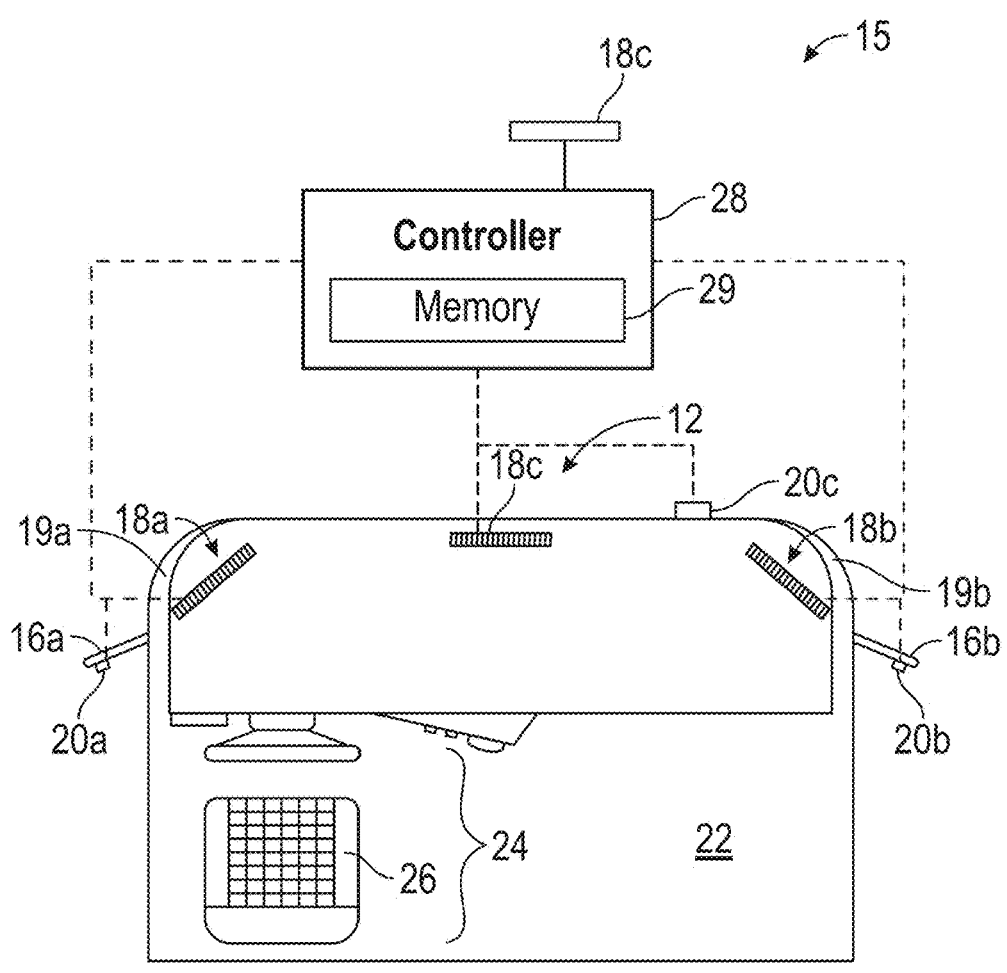
FIG. 2 is a schematic illustration of an interior of a vehicle cab.

A schematic view of a commercial vehicle 10 is illustrated in FIGS. 1A and 1B. FIG. 2 is a schematic top perspective view of the vehicle 10 cabin including displays. The vehicle 10 includes a vehicle cab or tractor 12 for pulling a trailer 14. It should be understood that the vehicle cab 12 and/or trailer 14 may be any configuration (e.g., different types or quantities of trailers). Although a commercial truck is contemplated in this disclosure, the invention may also be applied to other types of vehicles.

The vehicle 10 incorporates a camera monitor system (CMS) 15 (FIG. 2) that has driver and passenger side camera arms 16a, 16b (generally, "16") mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms and/or each arm housing may include one or more cameras and/or mirrors.

Each of the camera arms 16a, 16b includes a base that is secured to, for example, the cab 12. A pivoting arm is supported by the base and may articulate relative thereto. The camera arms 16 may instead be fixed, if desired. At least one rearward facing camera 20a, 20b (generally, "20") is arranged respectively within each camera arm 16. The exterior cameras 20a, 20b respectively provide captured images of an exterior field of view $FOV_{EX1}$, $FOV_{EX2}$ that each include at least one of the Class II (narrow) and Class IV (wide) views (FIG. 1B), which are one type of legally prescribed views in the commercial trucking industry. Multiple cameras also may be used in each camera arm 16a, 16b to provide these views, if desired. Class II and Class IV views are defined in European R46 legislation, for example, and the United States and other countries have similar drive visibility requirements for commercial trucks. For example, certain views may be prescribed in SAE J3155 or other regulations. Any reference to a "Class" view is not intended to be limiting, but is intended as exemplary for the type of view provided to a display by a particular camera. Each arm 16a, 16b may also provide a housing that encloses electronics that are configured to provide various features of the CMS 15.

First and second video displays 18a, 18b (generally, "18") are arranged on each of the driver and passenger sides within the vehicle cab 12 on or near the A-pillars 19a, 19b to display a streaming video of captured images of the Class II and Class IV views on its respective side of the vehicle 10 from the rear-facing side views captured by the exterior cameras 20a, 20b.

If video of Class V and/or Class VI views are also desired, a camera housing 16c and camera 20c may be arranged at or near the front of the vehicle 10 to provide those views (FIG. 1B). In one example, the camera 20c is incorporated into one of the camera arms 16 (e.g., the camera arm on the side opposite the vehicle operator). A third display 18c arranged within the cab 12 near the top center of the windshield can be used to display the Class V and Class VI views, which are toward the front of the vehicle 10, to the driver. The displays 18a, 18b, 18c face a driver region 24 within the cabin 22 where an operator is seated on a driver seat 26. The location, size and field(s) of view streamed to any particular display may vary from the configurations described in this disclosure and still incorporate the disclosed invention.

If video of Class VIII views is desired, camera housings can be disposed at the sides and rear of the vehicle 10 to provide fields of view including some or all of the Class VIII zones of the vehicle 10. As illustrated, the Class VIII view includes views immediately surrounding the trailer, and in the rear proximity of the vehicle including the rear of the trailer. In one example, a view of the rear proximity of the vehicle is generated by a rear facing trailer-mounted camera 30 (FIG. 1B) disposed at the rear of the vehicle (e.g., at rear of trailer 14), and can include both the immediate rear proximity and a traditional rear view (e.g. a view extending rearward to the horizon, as may be generated by a rear view mirror in vehicles without a trailer). In such examples, the third display 18c can include one or more frames displaying the Class VIII views. Alternatively, additional displays can be added near the first, second and third displays 18a, 18b, 18c and provide a display dedicated to providing a Class VIII view.

Additional displays may also be provided and used by the CMS 15, such as a display provided in a center console area of the vehicle cabin interior 24, generally located centrally in a bottom half of the vehicle cabin, used for navigation, infotainment, etc (i.e., a secondary information display). A display may be part of an instrument cluster (i.e., a primary information display) located behind the steering wheel, for example.

The CMS 15 is also configured to utilize the images from the cameras 20a, 20b, 30 as well as images from other cameras, ultrasonic, LiDar, radar, etc. that may be disposed about the vehicle to determine features of the vehicle, identify objects, and facilitate driver assistance features such as display overlays and semi-automated driver assistance systems.

These features and functions of the CMS 15 are used to implement multiple CMS 15 systems that aid in operation of the vehicle. It should be noted that a controller 28 (e.g., processor and memory 29; FIG. 2) for the CMS 15 can be used to implement the various functionalities disclosed in this application. The controller 28, which is in communication with the displays 18 and cameras 20, 30, may include one or more discrete units. For example, a centralized architecture may have a common controller arranged in the vehicle 10, while a decentralized architecture may use a controller provided in each of the displays 18, for example. Moreover, a portion of the controller 28 may be provided in the vehicle 10, while another portion of the controller 28 may be located elsewhere, for example, the camera arms 16. In another example, a master-slave display configuration may be used where one display includes the controller 28 while the other display receives the commands from the controller 28.

In terms of hardware architecture, such a controller can include a processor, memory (e.g., memory), and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 28 may be a hardware device for executing software, particularly software stored in memory (e.g., memory 29). The controller 28 can be a custom made or commercially available processor, a central processing unit (CPU), an auxiliary processor among several processors associated with the controller, a semiconductor-based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The disclosed input and output devices that may be coupled to system I/O interface(s) may include input devices, for example but not limited to, a keyboard, mouse, scanner, microphone, camera, mobile device, proximity device, etc. Further, the output devices, for example but not limited to, a printer, display, etc. Finally, the input and output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller 28 is in operation, the processor can be configured to execute software stored within the memory, to communicate data to and from the memory and to generally control operations of the computing device pursuant to the software. Software in memory, in whole or in part, is read by the processor, perhaps buffered within the processor, and then executed.

In various examples, the controller 28 includes one or modules having algorithm(s), equation(s) and/or decision manager(s) that receive input(s) from sensors and/or stored values. During vehicle operation, the controller 28 may communicate information to the driver, fleet operator, or others using an output (e.g, displays 18, speaker, etc.).

One disclosed CMS system is a reversing assist system that generates a trailer trajectory projection for a reversing maneuver of a vehicle 10. Accurately predicting trailer trajectory in reverse is particularly difficult. One way to improve accuracy is to use an image-based trailer tracking approach in which the rear-facing cameras "look for" movement of the trailer and then track the trailer motion using kinematic models. One such approach is described in PCT/US2023/079589 filed on Nov. 14, 2023, entitled "TRAILER BACKUP TRAJECTORY OVERLAY USING TRAILER CAMERA DISPLAY SYSTEM". However, frequently during reversing maneuvers of commercial trucks the operator must completely stop the vehicle, during which the operator may make additional trailer path adjustments via the steering wheel. There is no trailer motion to track when the vehicle is stopped, but determining trailer trajectory based upon steering wheel inputs can also be unreliable. To address these competing issues, the disclosed method of determining trailer trajectory uses a trailer motion image-based approach, but modifies the trailer trajectory based upon steering angle changes when that trailer motion image-based approach is not effective.

The trailer trajectory may be used by the CMS 15 for a variety of purposes. For example, trailer trajectory may be used to depict an overlay of the projected trailer path on one of the displays and/or be used to predict and avoid a potential collision between the trailer and an object. An example displayed output to one of the displays of the CMS system 15 is illustrated in the rear view scene 100 of FIG. 3. While the illustrated scene 100 includes a single person 120 and a single tree 130 for ease of description, it is appreciated that the scene 100 could, in a practical example, include more objects, more varied objects, a road, multiple classes of objects, etc. In the illustrated example, the scene 100 includes at least a portion of the rear end of the trailer 14. The scene 100 is displayed on one or more of the monitors 18*a*, 18*b*, 18*c* and/or another monitor within the vehicle.

During a reversing maneuver, the CMS 15 determines a projected rear trajectory (i.e., the expected path of a rear end of the trailer 14 and/or the trailer wheel path) and provides the projected trajectory as an overlay 110 on top of the scene 100. The overlay 110 extends from the rear end of the trailer 14 into the scene 100 and tracks the expected position of the rear end of the trailer 14 over time and/or distance. When the predicted trailer trajectory intersects with an object (e.g., person 120) the CMS 15 can generate an alert that indicates a potential collision may occur, for example. The alert takes the form of an audio output to the operator, a shaded identifier 122 in the overlay 110, a color change, or any combination thereof. In other examples, any other method of directing the operator's attention to the object 120 can be utilized.

Figure 3:
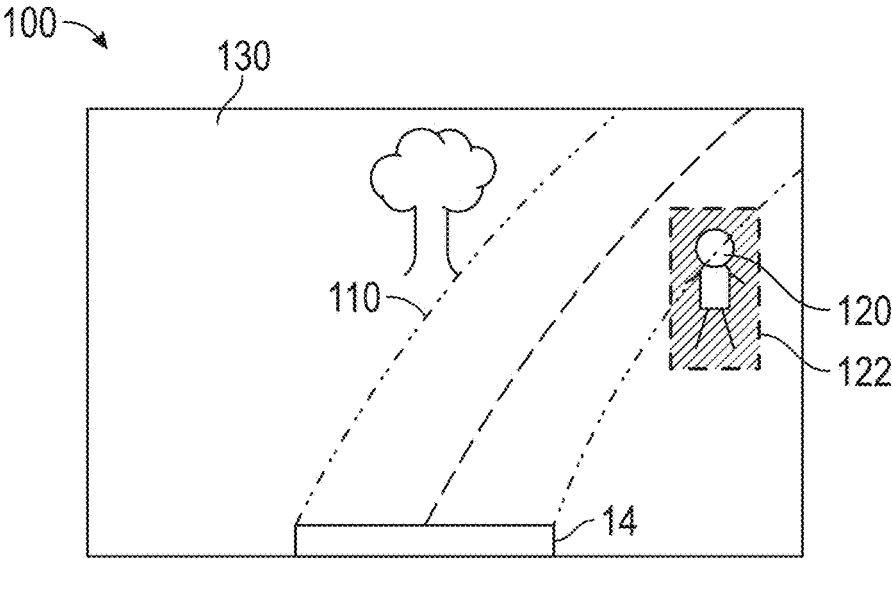
FIG. 3 schematically illustrates a rearview replacement display scene including a projected trailer trajectory.

With continued reference to the scene 100 of FIG. 3, FIG. 4 schematically illustrates a process 300 for generating the overlay 110 related to trailer trajectory. Initially, the CMS 15 receives images from the rear facing camera(s) 20a, 20b and/or 30, from the Class II/IV cameras, and the other cameras in the CMS 15. The CMS 15 then uses image analysis techniques to determine a trailer location, for example, by identifying at least one of a trailer wheel and trailer end position in a three dimensional (real world) space from the captured images. The trailer angle relative to the tractor 12 at the hitch point is also determined from this image analysis technique in a "Determine Trailer End Position and Angle" step 310. In one example, the trailer angle and end position are determined exclusively using image analysis without the use of angle sensors or other sensors beyond the image sensors (cameras) and captured images of the CMS 15. In addition, during this step the CMS 15 receives multiple parameters from the vehicle controller including truck speed, yaw rate, steering angle, gear and other camera extrinsic parameters from the vehicle's CAN bus and/or other sources.

As the vehicle 10 operates, the trailer end position and angle are calculated from the image multiple times, and a rate of change of the trailer angle and trailer position is determined in an "Estimate Trailer Angle Change Rate" step 320. The rate of change is over an interval that can be over time, over distance, or a combination of the two. Together steps 310, 320 comprise a trailer motion image-based approach 305 to determining the trailer trajectory. In one example, the rate of change in trailer location is determined by applying a Kalman filter to the determined trailer locations and trailer angles, as well as the additional parameters received from a vehicle controller with output of the Kalman filter being the rate of change. The rate of change tracks the change in position of the trailer in 3D space and is redetermined in each iteration of the process 300. In one example, the trailer angle rate and truck speed are converted to trailer location in two perpendicular (x and y) directions. An integration formula computes the trailer end's location change over a period (e.g., 1 second, 2 seconds, etc.). With the prediction of trailer location over the computed periods, the trajectory is obtained by connecting the dots.

Once the rate of change of the trailer location has been determined, the CMS 15 computes what the estimated position of the trailer will be in three dimensional space at a given time and/or distance interval in a "Computer Trailer End location" step 330. The process 300 loops the step 330 multiple times (at 335), with each loop determining the estimated end position at a distinct time and/or distance interval. The time and/or distance intervals are, in some examples, fixed intervals stored in a memory of the CMS 15. In alternative examples, the time and/or instant intervals can be dependent on speed, yaw rate, or any other parameter.

After determining the trailer location at each of the intervals, the process 300 combines the trailer locations to create a projected trajectory of the trailer end in a "Determine Trailer Trajectory in 3D space" step 340. The trailer trajectory is the route that the trailer is expected to travel (e.g., trailer end and/or trailer wheel) through three dimensional space as the trailer end travels from each determined interval to the next determined interval.

In one example, the complete trajectory connecting the trailer locations at each determined interval is determined using least square filtering the trailer end points at each interval and the resultant curve is the predicted trajectory.

After determining the 3D trajectory of the trailer end, the 3D trajectory is converted into a two dimensional graphical overlay in a "Convert 3D Trajectory to 2D Overlay" step 350. The conversion converts the three dimensional trailer end route to a two dimensional track through the scene 100 and creates a transparent overlay 110 of the track.

Once the transparent overlay 110 has been created, the overlay 110 is applied to the image and displayed to the operator in a Apply 2D Overlay to Rear View Display" step 360.

The above approach does not account for situations in which trailer location cannot be accurately tracked using image analysis, for example, when the trailer 14 is moving below a threshold speed (e.g., less than 2 miles per hour (mph)). This is especially true when the vehicle is stopped (0 mph) and the trailer angle change rate is also zero. In such cases, a method of trailer trajectory correction 345 is used.

When a zero or near zero vehicle velocity is determined (step 347), the trailer trajectory is revised (step 348) operator's change in steering angle is determined and a kinematic model is used to predict trailer trajectory rather than look to and "see" the trailer location based upon captured images. The trailer trajectory overlay is then modified based upon the steering change. Once the trailer again moves such that the trailer motion image-based approach 305 is sufficiently accurate, the steering angle change need not be referenced, but may be in case the driver makes a sudden steering angle change.

In one example, the disclosed method displays an overlay of the trailer trajectory onto a displayed captured image (e.g., onto display 18a, 18a, 18c, etc.) from one of the rear-facing cameras (e.g., cameras 20a, 20b and/or 30). The displayed captured image may be different the captured image used to identify the trailer location or it may be the same captured image. The displayed captured image may be part of a bird's-eye-view, a trailer rear view, or some other displayed view to visually communicate with the operator (e.g., scene 100 in FIG. 3).

In some examples, after determining the trajectory and before applying the overlay to the scene 100, the CMS 15 identifies any objects 120, 130 in the scene 100 that will intersect with the trajectory and output a warning to the vehicle operator. The warning can take the form of an audio output, a visual indicator (as in the example scene 110), a color change, or any similar alert. FIG. 5 illustrates a method 400 for achieving this alert.

Initially the CMS 15 identifies objects 120, 130 within the scene 100 using image based object identification techniques, and identifies the two dimensional position of the object in the scene 100 in an "Identify Objects in View" step 410. The two dimensional position of the objects 120, 130 within the scene 110 are then converted to a three dimensional position of the object 120, 130 in real space. After determining the three dimensional trajectory of the trailer 14 end, the CMS 15 compares the three dimensional position of each object to the trajectory in "Compare Object Position to Trajectory" step 420, and indicates an alert when the end of the trailer 14 passes through the same three dimensional space as the object 120, 130 in a "Generate Display Alert" step 430.

In more complex systems, a trajectory of the moving objects (e.g., person 120) can be estimated using a similar trajectory estimation process, and the projected trajectory of the moving object is compared to the projected trajectory of the end of the trailer 14. In such examples, and an alert is generated when the trajectory of the object interacts with a trajectory of the trailer 14 at the same time or within a predefined time span (e.g., in a range of 0 to 10 seconds).

The disclosed method captures dynamics of steering wheel change, being able to make trailer trajectory predictions with zero vehicle velocity, which provides better accuracy at large trailer angular velocity during a severe maneuver. As a result, the disclosed method introduces complete formulation that captures trailer angle change, so the long-term prediction is still accurate.

Although an example embodiment has been disclosed, a worker of ordinary skill in this art would recognize that certain modifications would come within the scope of the claims. For that reason, the following claims should be studied to determine their true scope and content.

What is claimed is:

1. A method of determining a trailer trajectory for a trailer, comprising the steps of:
  a) while the trailer is moving above a threshold speed, providing the trailer rear trajectory using an image-based analysis by:
    a1) determining a trailer location based upon at least one captured image;
    a2) determining a trailer angle change rate based upon the at least one captured image;
    a3) determining the trailer rear trajectory based upon the trailer location and the trailer angle change rate;
    a4) displaying an overlay related to the trailer rear trajectory during the image-based analysis;
  b) while the trailer is below the threshold speed, providing a revised trailer rear trajectory using a non-image-based analysis by:
    b1) determining a steering change;
    b2) revising the trailer rear trajectory from the image-based analysis in step a) based upon the steering change; and
    b3) displaying a modified overlay related to the revised trailer rear trajectory based upon the steering change during the non-image-based analysis.

2. The method of claim 1, wherein steps a) and b) are performed while the trailer is moving in reverse.

3. The method of claim 1, wherein step a1) is performed by identifying at least one of a trailer wheel and a trailer end.

4. The method of claim 3, wherein step a2) is performed by determining a trailer angle, a change in the trailer angle over an interval, and a change in the trailer location over the interval.

5. The method of claim 4, wherein the interval is at least one of time and distance.

6. The method of claim 4, wherein step a3) is performed using the trailer location over the interval.

7. The method of claim 1, wherein steps a4) and b3) are performed by displaying an overlay of the trailer rear trajectory onto a displayed captured image.

8. The method of claim 7, wherein the displayed captured image is different than the at least one captured image.

9. The method of claim 8, wherein the displayed captured image is part of a bird's-eye-view or a trailer rear view.

10. The method of claim 7, wherein the displayed captured image is the same as the at least one captured image.

11. The method of claim 1, wherein the threshold speed is less than 2 miles per hour.

12. The method of claim 11, wherein the threshold speed is zero miles per hour.

13. The method of claim 12, wherein the trailer angle change rate is zero.

14. The method of claim 1, wherein step b1) is performed by obtaining the steering angle from a CAN bus.

15. A camera monitor system (CMS) for a vehicle, comprising:
  at least one rear-facing camera configured to obtain at least one captured image;
  at least one display configured to depict the at least one captured image;
  a CMS controller including a memory and a processor, the CMS controller in communication with the at least one rear-facing camera and the at least one display, wherein the memory storing instructions for causing the processor to:
  a) while the trailer is moving above a threshold speed, providing a trailer rear trajectory using an image-based analysis:
    a1) determine a trailer location based upon the at least one captured image;
    a2) determine a trailer angle change rate based upon the at least one captured image;
    a3) determine the trailer rear trajectory based upon the trailer location and the trailer angle change rate;
    a4) display an overlay related to the trailer rear trajectory on one of the at least one displays during the image-based analysis;
  b) while the trailer is below the threshold speed, providing a revised trailer rear trajectory using a non-image-based analysis:
    b1) determine a steering change;
    b2) revise the trailer rear trajectory from the image-based analysis in step a) based upon the steering change; and
    b3) display a modified overlay related to the revised trailer rear trajectory based upon the steering change during the non-image-based analysis.

16. The CMS of claim 15, wherein steps a) and b) are performed while the trailer is moving in reverse, and wherein step b1) is performed by obtaining the steering angle from a CAN bus.

17. The CMS of claim 15, wherein step a1) is performed by identifying at least one of a trailer wheel and a trailer end, wherein step a2) is performed by determining a trailer angle, a change in the trailer angle over an interval, and a change in the trailer location over the interval, wherein step a3) is performed using the trailer location over the interval.

18. The CMS of claim 15, wherein steps a4) and b3) are performed by displaying an overlay of the trailer rear trajectory onto a displayed captured image.

19. The CMS of claim 15, wherein the threshold speed is less than 2 miles per hour.

20. The CMS of claim 19, wherein the threshold speed is zero miles per hour, wherein the trailer angle change rate is zero.

* * * * *